United States Patent
Marti et al.

(10) Patent No.: US 9,971,977 B2
(45) Date of Patent: May 15, 2018

(54) OPUS ENTERPRISE REPORT SYSTEM

(71) Applicant: Honeywell International Inc., Morristown, NJ (US)

(72) Inventors: Jerry Marti, West Salem, OH (US); Ajo Paul, Bangalore (IN); Sundaramoorthi Thangavel, Bangalore (IN); Ajay N. Nair, Bangalore (IN); Midhun Naga Kumar Jonnadula, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 670 days.

(21) Appl. No.: 14/059,286

(22) Filed: Oct. 21, 2013

(65) Prior Publication Data

US 2015/0112989 A1 Apr. 23, 2015

(51) Int. Cl.
*G06F 19/00* (2011.01)
*G06Q 10/06* (2012.01)

(52) U.S. Cl.
CPC .................................... *G06Q 10/06* (2013.01)

(58) Field of Classification Search
CPC ......... H04L 67/10; H04L 41/12; H04L 43/10; H04L 2012/40215; H04L 1/1887; H04L 43/08; G05B 19/4185; G05B 2219/31131; G05B 2219/31151; G05B 2219/31467; G05B 2219/31472; G06F 17/30; G06F 17/30194
See application file for complete search history.

(56) References Cited

U.S. PATENT DOCUMENTS

| | | | |
|---|---|---|---|
| 4,375,637 | A | 3/1983 | Desjardins |
| 4,816,208 | A | 3/1989 | Woods et al. |
| 5,042,265 | A | 8/1991 | Baldwin et al. |
| 5,161,387 | A | 11/1992 | Metcalfe et al. |

(Continued)

FOREIGN PATENT DOCUMENTS

| | | |
|---|---|---|
| WO | WO 01/97146 | 12/2001 |
| WO | WO 02/052432 | 7/2002 |

(Continued)

OTHER PUBLICATIONS http://www.loytec.com/products/web/lweb-900, "LWEB-900 Integrated Building Management System", 5 pages, printed Nov. 15, 2014.

(Continued)

*Primary Examiner* — Darrin Dunn
(74) *Attorney, Agent, or Firm* — Seager, Tufte & Wickhem, LLP

(57) ABSTRACT

An approach for managing much information of many of controllers at multiple locations. A configuration map regarded as a dataset may be used for identifying and retrieving a group of data being sought in the form of instances of the dataset. The instances may be stored. A report may be used to select certain instances of the data according to a format of the report. The report may be manually or automatically provided. A profile may be developed to obtain instances of a dataset that match the profile and show instances that do not necessarily match the profile. The instances that do not match the profile may be reset to settings of the profile or be noted as approved exceptions and should not be reset.

11 Claims, 11 Drawing Sheets

(56) References Cited

U.S. PATENT DOCUMENTS

| | | |
|---|---|---|
| 5,385,297 A | 1/1995 | Rein et al. |
| 5,390,206 A | 2/1995 | Rein et al. |
| 5,544,036 A | 8/1996 | Brown, Jr. et al. |
| 5,768,119 A | 6/1998 | Havekost et al. |
| 5,929,761 A | 7/1999 | Van der Laan et al. |
| 5,949,303 A | 8/1999 | Watson et al. |
| 5,955,306 A | 9/1999 | Beheshti et al. |
| 6,031,343 A | 2/2000 | Recknagel et al. |
| 6,124,790 A | 9/2000 | Golov et al. |
| 6,141,595 A | 10/2000 | Gloudeman et al. |
| 6,178,362 B1 | 1/2001 | Woolard et al. |
| 6,185,483 B1 | 2/2001 | Drees |
| 6,195,309 B1 | 2/2001 | Ematrudo |
| 6,223,544 B1 | 5/2001 | Seem |
| 6,295,526 B1 | 9/2001 | Kreiner et al. |
| 6,295,527 B1 | 9/2001 | McCormack et al. |
| 6,301,624 B1 | 10/2001 | Lee et al. |
| 6,314,328 B1 | 11/2001 | Powell |
| 6,351,213 B1 | 2/2002 | Hirsch |
| 6,356,282 B2 | 3/2002 | Roytman et al. |
| 6,389,464 B1 | 5/2002 | Krishnamurthy et al. |
| 6,420,968 B1 | 7/2002 | Hirsch |
| 6,430,712 B2 | 8/2002 | Lewis |
| 6,466,654 B1 | 10/2002 | Cooper et al. |
| 6,473,407 B1 | 10/2002 | Ditmer et al. |
| 6,492,901 B1 | 12/2002 | Ridolfo |
| 6,535,122 B1 | 3/2003 | Bristol |
| 6,549,135 B2 | 4/2003 | Singh et al. |
| 6,643,355 B1 | 11/2003 | Tsumpes |
| 6,643,516 B1 | 11/2003 | Stewart |
| 6,675,591 B2 | 1/2004 | Singh et al. |
| 6,681,156 B1 | 1/2004 | Weiss |
| 6,690,980 B2 | 2/2004 | Powell |
| 6,761,470 B2 | 7/2004 | Sid |
| 6,813,587 B2 | 11/2004 | McIntyre et al. |
| 6,816,811 B2 | 11/2004 | Seem |
| 6,832,120 B1 | 12/2004 | Frank et al. |
| 6,870,141 B2 | 3/2005 | Damrath et al. |
| 6,879,253 B1 | 4/2005 | Thuillard |
| 6,892,546 B2 | 5/2005 | Singh et al. |
| 6,919,809 B2 | 7/2005 | Blunn et al. |
| 6,947,972 B2 | 9/2005 | Chun |
| 6,955,302 B2 | 10/2005 | Erdman, Jr. |
| 6,957,110 B2 * | 10/2005 | Wewalaarachchi .... G05B 15/02 700/17 |
| 6,966,060 B1 | 11/2005 | Young et al. |
| 6,970,763 B2 | 11/2005 | Kato |
| 6,973,627 B1 | 12/2005 | Appling |
| 6,990,821 B2 | 1/2006 | Singh et al. |
| 7,006,524 B2 * | 2/2006 | Freeman ................. H04Q 9/00 370/351 |
| 7,009,510 B1 | 3/2006 | Douglass et al. |
| 7,024,283 B2 | 4/2006 | Bicknell |
| 7,026,925 B2 | 4/2006 | Roche et al. |
| 7,031,880 B1 | 4/2006 | Seem et al. |
| 7,062,389 B2 | 6/2006 | Johnson et al. |
| 7,068,391 B2 | 6/2006 | Dewitte et al. |
| 7,068,931 B2 | 6/2006 | Tokunaga |
| 7,069,181 B2 | 6/2006 | Jerg et al. |
| 7,085,674 B2 | 8/2006 | Iwasawa |
| 7,107,268 B1 | 9/2006 | Zawadzki et al. |
| 7,113,085 B2 | 9/2006 | Havekost |
| 7,133,141 B1 | 11/2006 | Abi-Salch |
| 7,171,287 B2 | 1/2007 | Weiss |
| 7,183,907 B2 | 2/2007 | Simon et al. |
| 7,206,646 B2 | 4/2007 | Nilson et al. |
| 7,243,044 B2 | 7/2007 | McCalla |
| 7,250,856 B2 | 7/2007 | Havekost et al. |
| 7,272,452 B2 | 9/2007 | Coogan et al. |
| 7,277,018 B2 | 10/2007 | Reyes et al. |
| 7,308,539 B2 | 12/2007 | Fuhs et al. |
| 7,320,023 B2 | 1/2008 | Chintalapati et al. |
| 7,345,580 B2 | 3/2008 | Akamatsu et al. |
| 7,379,997 B2 | 5/2008 | Ehlers et al. |
| 7,386,586 B1 | 6/2008 | Headley et al. |
| 7,428,726 B1 | 9/2008 | Cowan et al. |
| 7,457,869 B2 | 11/2008 | Kernan |
| 7,460,020 B2 | 12/2008 | Reyes et al. |
| 7,490,319 B2 | 2/2009 | Blackwell et al. |
| 7,496,911 B2 | 2/2009 | Rowley et al. |
| 7,565,225 B2 | 7/2009 | Dushane et al. |
| 7,596,613 B2 | 9/2009 | Silverthorne et al. |
| 7,644,371 B2 | 1/2010 | Robertson et al. |
| 7,653,459 B2 | 1/2010 | Pouchak et al. |
| 7,703,073 B2 | 4/2010 | Illowsky et al. |
| 7,734,572 B2 | 6/2010 | Wiemeyer et al. |
| 7,774,457 B1 | 8/2010 | Talwar et al. |
| 7,782,302 B2 | 8/2010 | Lee et al. |
| 7,819,334 B2 | 10/2010 | Pouchak et al. |
| 7,826,929 B2 | 11/2010 | Wacker |
| 7,870,090 B2 | 1/2011 | McCoy et al. |
| 7,873,719 B2 | 1/2011 | Bishop et al. |
| 7,886,031 B1 | 2/2011 | Taylor et al. |
| 7,890,927 B2 | 2/2011 | Eldridge et al. |
| 7,900,228 B2 | 3/2011 | Stark et al. |
| 7,904,186 B2 | 3/2011 | Mairs et al. |
| 7,933,981 B1 * | 4/2011 | Cannon, III ............. H04L 41/12 709/220 |
| 7,941,786 B2 | 5/2011 | Scott et al. |
| 7,953,847 B2 * | 5/2011 | Grelewicz ........... G06F 11/3428 706/50 |
| 8,060,602 B2 | 11/2011 | Singh et al. |
| 8,078,481 B2 | 12/2011 | Steinbarth et al. |
| 8,090,477 B1 | 1/2012 | Steinberg |
| 8,112,162 B2 | 2/2012 | Pouchak et al. |
| 8,146,060 B2 | 3/2012 | Lekel |
| 8,185,871 B2 | 5/2012 | Nixon et al. |
| 8,190,273 B1 | 5/2012 | Federspiel et al. |
| 8,218,570 B2 | 7/2012 | Moran et al. |
| 8,224,466 B2 | 7/2012 | Wacker |
| 8,224,763 B2 | 7/2012 | Guralnik et al. |
| 8,224,888 B2 | 7/2012 | Brindle |
| 8,225,292 B2 | 7/2012 | Naslaysky et al. |
| 8,239,500 B2 | 8/2012 | Pouchak |
| 8,301,386 B1 * | 10/2012 | Redmond ............ G05B 19/408 702/16 |
| 8,335,593 B2 | 12/2012 | Johnson et al. |
| 8,341,599 B1 | 12/2012 | Angalet et al. |
| 8,347,291 B2 | 1/2013 | Marwinski |
| 8,352,047 B2 | 1/2013 | Walter |
| 8,417,666 B2 | 4/2013 | Bailor et al. |
| 8,527,947 B2 | 9/2013 | Clemm |
| 8,572,502 B2 | 10/2013 | Dharwada et al. |
| 8,572,616 B2 | 10/2013 | Cai et al. |
| 8,600,556 B2 | 12/2013 | Nesler et al. |
| 8,819,562 B2 | 8/2014 | Nair et al. |
| 8,984,169 B2 * | 3/2015 | Mera .................. H04L 43/08 709/248 |
| 9,026,253 B2 | 5/2015 | Majewski et al. |
| 9,043,463 B1 * | 5/2015 | Cohn ................ H04L 63/0272 709/225 |
| 2002/0002425 A1 | 1/2002 | Dossey et al. |
| 2002/0073076 A1 | 6/2002 | Xu et al. |
| 2002/0099754 A1 * | 7/2002 | Ueda ................ G06F 17/30578 718/1 |
| 2002/0122073 A1 | 9/2002 | Abrams et al. |
| 2002/0124078 A1 * | 9/2002 | Conrad .................. H04L 12/24 709/224 |
| 2002/0152298 A1 | 10/2002 | Kikta et al. |
| 2002/0165934 A1 * | 11/2002 | Conrad .................. H04L 41/22 709/217 |
| 2003/0078677 A1 | 4/2003 | Hull et al. |
| 2003/0101009 A1 | 5/2003 | Seem |
| 2003/0171851 A1 | 9/2003 | Brickfield et al. |
| 2003/0174070 A1 * | 9/2003 | Garrod .................. G08C 17/00 340/870.07 |
| 2003/0195957 A1 * | 10/2003 | Banginwar ............. H04L 41/12 709/223 |
| 2004/0027004 A1 | 2/2004 | Bayoumi et al. |
| 2004/0143510 A1 | 7/2004 | Haeberle et al. |
| 2004/0146065 A1 * | 7/2004 | Li ......................... H04L 43/10 370/449 |

(56) References Cited

U.S. PATENT DOCUMENTS

| | | | |
|---|---|---|---|
| 2004/0230328 A1* | 11/2004 | Armstrong | G05B 19/418 700/83 |
| 2005/0038571 A1 | 2/2005 | Brickfield et al. | |
| 2005/0043862 A1 | 2/2005 | Brickfield et al. | |
| 2005/0071457 A1* | 3/2005 | Yang-Huffman | H04L 41/0893 709/224 |
| 2005/0143863 A1 | 6/2005 | Ruane et al. | |
| 2005/0160119 A1* | 7/2005 | Yoneda | H04L 67/02 |
| 2005/0193285 A1 | 9/2005 | Jeon | |
| 2005/0203490 A1 | 9/2005 | Simonson | |
| 2005/0222889 A1 | 10/2005 | Lai et al. | |
| 2006/0020962 A1 | 1/2006 | Stark et al. | |
| 2006/0038672 A1 | 2/2006 | Schoettle | |
| 2006/0058923 A1 | 3/2006 | Kruk et al. | |
| 2006/0064305 A1 | 3/2006 | Alonso | |
| 2006/0069886 A1 | 3/2006 | Sandoval | |
| 2006/0077726 A1 | 4/2006 | Simmitsu | |
| 2006/0095835 A1 | 5/2006 | Kennedy et al. | |
| 2006/0136558 A1 | 6/2006 | Sheehan et al. | |
| 2006/0168013 A1 | 7/2006 | Wilson et al. | |
| 2006/0168396 A1* | 7/2006 | LaMothe | G05B 23/0221 711/113 |
| 2006/0173973 A1* | 8/2006 | Eigenbrodt | G06Q 10/10 709/217 |
| 2006/0253205 A1 | 11/2006 | Gardiner | |
| 2007/0078913 A1* | 4/2007 | Crescenti | G06F 11/1464 |
| 2007/0123249 A1* | 5/2007 | Sun | G01S 19/14 455/423 |
| 2007/0198674 A1 | 8/2007 | Li et al. | |
| 2008/0010049 A1 | 1/2008 | Pouchak et al. | |
| 2008/0189162 A1 | 8/2008 | Ganong et al. | |
| 2008/0249641 A1* | 10/2008 | Enver | G05B 19/042 700/9 |
| 2009/0055914 A1 | 2/2009 | Azami | |
| 2009/0106684 A1 | 4/2009 | Chakra et al. | |
| 2009/0113037 A1 | 4/2009 | Pouchak | |
| 2009/0182778 A1* | 7/2009 | Tormasov | G06F 17/30165 |
| 2009/0287526 A1 | 11/2009 | Ramkumar et al. | |
| 2009/0319532 A1* | 12/2009 | Akelbein | G06F 17/30221 |
| 2010/0106543 A1 | 4/2010 | Marti | |
| 2010/0131653 A1 | 5/2010 | Dharwada et al. | |
| 2010/0131877 A1 | 5/2010 | Dharwada et al. | |
| 2010/0198651 A1 | 8/2010 | Johnson et al. | |
| 2010/0251184 A1 | 9/2010 | Majewski et al. | |
| 2010/0286937 A1 | 11/2010 | Hedley et al. | |
| 2010/0293363 A1* | 11/2010 | Meyer | G05B 19/0426 713/1 |
| 2011/0010654 A1 | 1/2011 | Raymond et al. | |
| 2011/0087731 A1 | 4/2011 | Wong et al. | |
| 2011/0093493 A1 | 4/2011 | Nair et al. | |
| 2011/0098863 A1 | 4/2011 | Miki | |
| 2011/0113360 A1 | 5/2011 | Johnson et al. | |
| 2011/0196539 A1* | 8/2011 | Nair | G05B 19/41865 700/276 |
| 2011/0298608 A1 | 12/2011 | Ranjan et al. | |
| 2011/0316688 A1 | 12/2011 | Ranjan et al. | |
| 2012/0005731 A1 | 1/2012 | Lei et al. | |
| 2012/0166992 A1 | 6/2012 | Huynh et al. | |
| 2012/0185560 A1* | 7/2012 | Mera | H04L 67/325 709/217 |
| 2013/0085613 A1* | 4/2013 | Bester | F24F 11/0001 700/277 |
| 2013/0132346 A1* | 5/2013 | Varadarajan, Sr. | G06F 11/1448 707/639 |
| 2013/0132967 A1* | 5/2013 | Soundararajan | G06F 9/5066 718/104 |
| 2013/0203359 A1* | 8/2013 | Seiler | H04Q 9/00 455/67.11 |
| 2013/0218889 A1 | 8/2013 | Marti et al. | |
| 2014/0114440 A1 | 4/2014 | Marti et al. | |
| 2014/0244823 A1* | 8/2014 | Cornett | G05B 19/05 709/223 |
| 2014/0280878 A1* | 9/2014 | Hardin | H04L 41/145 709/224 |
| 2014/0289202 A1* | 9/2014 | Chan | G06F 9/54 707/652 |
| 2014/0303752 A1* | 10/2014 | Clark | G05B 15/02 700/9 |
| 2015/0105878 A1* | 4/2015 | Jones | G06F 9/44505 700/83 |
| 2015/0112469 A1* | 4/2015 | Da Silva Neto | H04W 4/04 700/108 |
| 2015/0201020 A1* | 7/2015 | Gueta | H03M 7/30 709/232 |
| 2015/0295998 A1* | 10/2015 | Morrill | H04L 29/06027 709/203 |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

Samsung, "Intelligent Building Management System, ControlCity-NX," 20 pages, May 31, 2012.

U.S. Appl. No. 14/862,715, filed Sep. 23, 2015.

U.S. Appl. No. 14/862,858, filed Sep. 23, 2015.

Atere-Roberts et al., "Implementation of a Computerized Maintenance Management System for the City of Atlanta," 12 pages, prior to Oct. 21, 2013.

Business Objects, "Crystal Reports," 4 pages, 2003.

Honeywell, "ComfortPoint Open BMS Release 100," Specification and Technical Data, 13 pages, Jun. 2012.

http://www.de2m.com/DE24_Technical.html, "DE2R Technical Overview," 4 pages, printed Mar. 8, 2013.

Adobe Acrobat 6.0 Standard, Version 6.0.2, Screenshots, 2 pages, May 18, 2004.

Honeywell Spyder Bacnet User's Guide, 242 pages, Revised Jul. 2009.

Honeywell Spyder User's Guide 202 pages, Released Jul. 2007.

Honeywell, "Excel Building Supervisor-Integrated R7044 and FS90 Ver. 2.0," Operator Manual, 70 pages, Apr. 1995.

Honeywell, "Excel 15B W7760B Building Manager," User's Guide, 84 pages, Revised Jan. 2005.

http://blogs.msdn.com/b/khen1234/archive/2005/05/11/416392.aspx, "Regular Expressions in T-SQL," 4 pages, May 11, 2005.

http://en.wikipedia.org/wiki/JAR_(file_format), "JAR (file Format)—Wikipedia, the Free Encyclopedia," 3 pages, printed Dec. 26, 2009.

http://www.google.com/maps, "Google Maps, Pin Location," 1 page, prior to Nov. 21, 2008.

Johnson Controls, "Fx Workbench, User's Guide," 818 pages, issued May 19, 2008, (this article will be uploaded to USPTO website in 5 parts).

Microsoft Word Screen Shots, 2 pages, prior to Nov. 21, 2008.

Novar, "Opus Supervisor User Guide," pp. 1-159, Feb. 1, 2012.

Novar, "Demand Response, Program Implementation and Execution," 8 pages, Oct. 28, 2008.

Novar, "Media Backgrounder," 10 pages, prior to Feb. 22, 2012.

Siemens, BACnet for Desigo 27 Pages, prior to Dec. 30, 2009.

Trane, "System Programming, Tracer Summit Version 14, BMTW-SVP01D-EN," 623 pages, 2002, (this article will be uploaded to USPTO website in 3 parts).

Tridium, "NiagaraAX Product Model Overview," 7 pages, 2005.

Tridium, "Tridium & Niagara Framework Overview," 9 pages, prior to Oct. 28, 2008.

Bersoff et al., "Impacts of Life Cycle Models on Software," Communications of the ACM, vol. 34, No. 8, pp. 104-118, Aug. 1991.

(56) References Cited

OTHER PUBLICATIONS

U.S. Appl. No. 14/327,451, filed Jul. 9, 2014.
http://domin.dom.edu/documents/emaildocs/outlook/, "Outlook Web Access 2003," 19 pages, printed Nov. 7, 2013.
Kalavade et al., "A Hardware-Software Codesign Methodology for DSP Applications," IEEE Design and Test of Computers, pp. 16-28, 1993.
Magnusson et al., "Simics: A Full Simulation Platform," IEEE, pp. 50-58, 2002.
McCown et al., "APSIM: A Novel Software System for Model Development, Model Testing and Simulation in Agricultural Systems Research," Agricultural Systems, vol. 50, pp. 255-271, 1996.
Niagara, "Niagara AX-3.x User Guide," Tridium Inc., 436 pages, 2007.
Pressman, "Software Engineering Notes—Compiled from Software Engineering a Practitioner's Approach," Fifth Edition, 67 pages, 2009.
Simunic et al, "Cycle-Accurate Simulation of Energy Consumption in Embedded Systems," ACM, pp. 867-872, 1999.
Trane, "Tracer MP580/581 Programmable Controllers," CNT-PRC002-EN, Mar. 2003.
Vykon by Tridium, "Niagara Browser Access Guide," 125 pages, revised Aug. 15, 2002.
Vykon by Tridium, "Niagara Networking & Connectivity Guide," Niagara Release 2.3, 245 pages, 2002.

* cited by examiner

OPUS ENTERPRISE REPORT SYSTEM

BACKGROUND

The present disclosure pertains to managing information, and particularly to selective accessing certain portions from many controllers containing large amounts of information.

SUMMARY

The disclosure reveals an approach for managing much information of many of controllers at multiple locations. A configuration map regarded as a dataset may be used for identifying and retrieving a group of data being sought in the form of instances of the dataset. The instances may be stored. A report may be used to select certain instances of the data according to a format of the report. The report may be manually or automatically provided. A profile may be developed to obtain instances of a dataset that match the profile and show instances that do not match the profile. The instances that do not match the profile may be reset to settings of the profile or be noted as approved exceptions and not be reset.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Figure 1:
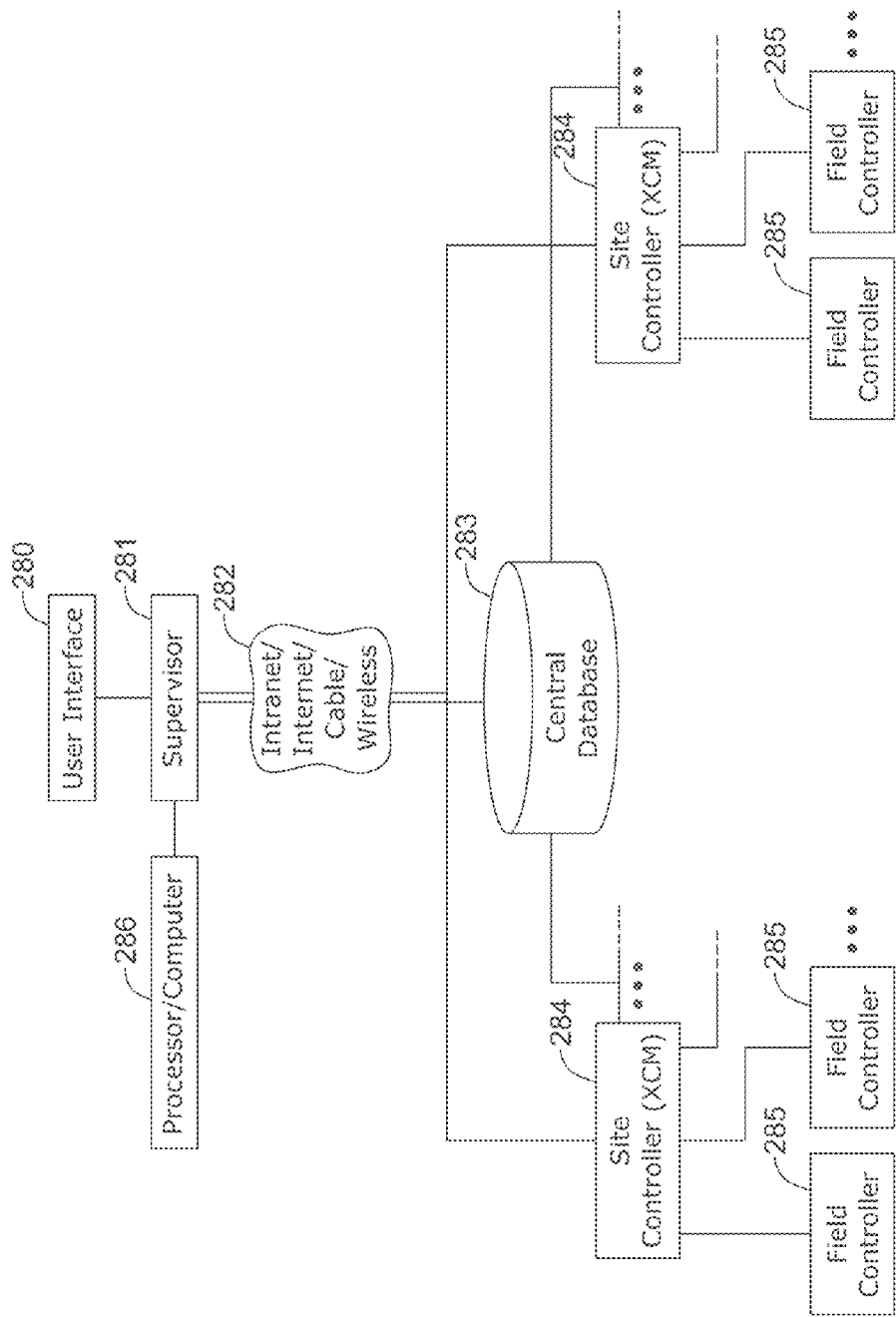
FIG. 1 is a schematic diagram of a supervisor and several levels of controllers.

The Novar™ Opus™ supervisor may be a target application to provide the present approach that is being disclosed herein. In FIG. 1 a user with an interface 280 of the Novar Opus supervisor 281 may manage and communicate with hundreds or thousands of remote site controllers 284 from a centralized location via the users' intranet 282. Each of these site controllers 284 may be referred to as an XCM controller. A central database or store 283 may provide storage for controllers 284 and other mechanisms. Database 283 may be managed by supervisor 281. The XCM controller 284 in turn may manage and communicate with tens or hundreds of field controllers 285, within the site, that perform real time control of building equipment such as HVAC units, lighting panels, metering and refrigeration circuits, and other items. A processor/computer 286 may be connected to supervisor 281 for operational and/or other purposes. Processor/computer 286 may also be utilized for various purposes relative to other components of system Controller configuration data for each site controller may be maintained within each remote site XCM controller. Regularly, the users may access the site controllers and adjust parameters where the changes are saved in a remote site controller memory. A user may have a need to view and analyze the most recent control configuration settings for hundreds to thousands of remote XCM site controllers. For example, the user may want to view a tabular report of temperature control settings for roof top unit control units from a region or from the whole enterprise of remote site controllers. Also, the user may want to see a report showing the store weekly schedules for many sites. Another report that the user may want to view is an exception report that compares the settings in a site controller to a corporate standard profile with specifications and shows only those controllers that are not matching the profile. An additional user's need may be for these reports to be automatically generated and saved to either a file or sent as an email attachment at a scheduled date and time. This may allow specialized reports like an energy report to be sent to an energy analyst without requiring the analyst to access the system directly.

An issue with the application may be that there is no way to easily collect the required current data from the multiple locations and organize them into identifiable collections of common data that can be quickly compiled into a report output format. Each of the site controllers may consist of tens of thousands of configuration values where the user may only be interested in a subset of control oriented setpoints. The user may need to select data points individually and setup imports to the supervisor. The import setup may need to be done for each deployed XCM site controller. Next, the user may need to create a custom view specifically to render the imported data point values into a table view. Once the view is rendered, the user may manually export the table to a report file. The user may then manually email the report file to an intended recipient. When additional data is required for reporting, the user may need to repeat the steps to import the points from each additional XCM site controller and create a new custom view to render the data into the tabular format. To accomplish the above mentioned report features in the application, the present controller setting data may need to be identified and collected from the hundreds to thousands of deployed remote site controllers. The data may need to be organized according to the specific needs of the type of report requested by the user. Once collected and organized, the data may need to be either rendered in a client view or outputted to a file for future use.

The present approach may provide a solution to some of the above-stated issues by providing the following product features and the necessary user activities required for these features.

The user may need to first identify the data of interest. The Opus System may consist of much data but only certain sets of data may be of interest to a user. The present approach may provide a new dataset definition that allows the structural identity of the interested data. The dataset may be defined one time within the application and serve as a single map of configuration settings that is found instantiated multiple times and places across the hundreds to thousands of deployed XCM site controllers. The dataset approach may select specific information to clearly and completely identify the data that the user is interested in viewing in a report. This may assume that the dataset definition maps are consistently applied across every instance of the site configuration data throughout the enterprise. An example of a dataset may be mapped to a known field controller or an RTU control configuration. A dataset reference may identify the base configuration class type and then the specific settings (properties) associated with a configuration relative to a base.

Once a dataset exists, then the present approach may allow the user to create data collection jobs that will, on demand or schedule, poll all instances of the specified datasets into a central, optimized datastore within the Opus Supervisor. The data collection may occur by connecting to all identified remote XCM site controllers or it may be directed to extract the dataset instances from local XCM site controller backup files. If the user elects to extract the data dataset instances from the backup files, it is assumed that the approach is automatically backing up the XCM site controllers to ensure that the configuration data in the backup files are fresh. Once the data have been collected in the datastore, the user may manually create a report setup that allows the user to configure the specific data from one or more datasets that the user wants to include in a single report. The user may either run the report manually or run the report automatically on a date and time schedule. The manual mode may be run from the Opus Architect™ client and the report data may be rendered in a tabular view. The automated mode may allow the report data to be written to either a PDF or a CSV file based on a calendar and time schedule trigger. Also, the automated report files may be emailed to one or more recipients.

The user may utilize the present approach in the Opus Supervisor and Opus Architect applications. The following activities may be followed.

First, one or more dataset definitions may be created. The Opus System may consist of a large amount of data inclusive of configuration settings, status and historical data. Access to all of this data is not necessarily required for the Opus Reports feature. Data values may be dispersed throughout the various Opus XCM controllers within the enterprise.

Datasets may exist to allow a user to define only the relevant data required for the desired reports. By specifying the interested data in a dataset, the Opus Report feature may be more efficient in organizing the data to enhance a user experience when viewing the report data. A dataset may identify a configuration setting structure and be only defined one time for the Opus System. Dataset information may be necessary to locate virtually all instances of a configuration and desired settings. Many of the control system type datasets may be predefined for the user. However, new datasets may be added as needed by the user. The use of the dataset may assume that the configuration is an absolute pattern map of a configuration used many times across virtually all of the XCM site controllers in the enterprise.

Second, dataset collection jobs may be created and executed. Once the required datasets have been identified, the Opus Report feature may require that all instances of the desired datasets need to be collected from the XCM site controllers into centralized, optimized data storage. Such collection may enable a report mechanism to operate efficiently to provide an optimal user interface response.

The user may create a data collection job by selecting the group, sites, XCM and datasets that the user would like to have in the central datastore available and usable for reports. Once created, the job may be executed manually or it may be scheduled to execute based on a calendar and time schedule. When the collection job is triggered, a connection to each XCM specified in the job may be established and all instances of the dataset specified will be copied into the datastore. Optionally, the user may elect to retrieve the data from the XCM backup files instead of connecting directly to the XCM. A retrieval of the data may allow the data to be refreshed periodically and automatically. A historical log of the job collection execution may be maintained, thus allowing the user to view whether the collection was successful or see the reasons for failure.

Third, user defined reports may be created and utilized. Once the data collection has been configured and executed, there may be actual instance data from the remote XCM controllers available for reporting. The user may manage multiple reports within the Opus Supervisor. The reports may be created by the user and be configured one time and be used as often as required and by one or multiple users. Based on needs of the enterprise, reports may be created by grouping data from various datasets. For example, lighting control settings may be reported together, the roof top HVAC settings or the energy data may be collated and reported. The user may also setup regional reports based on the site selections made in the report setups. Once a report setup has been established, the user may invoke manually and view the selected data in tabular form. Alternately, the report setup may be automated to run on a specified date, week day and time, and be generated as a report output PDF or CSV file. The file may also be automatically emailed to one or more recipients.

Fourth, exception reports may be utilized. The following features may be provided with the Opus Report approach. The user may be able to create corporate profiles of control setpoints or schedules. A profile may be a corporate standard set of properties that the user chooses to apply to all like control entities or schedules across their respective enterprises. The user may have determined for optimal performance that the sales floor RTU control settings should be the same across the whole enterprise. The present Opus Reports approach may allow one to create a profile mapped directly to the datasets created earlier. A profile may allow specific control thresholds and timing to be set and saved within the Opus Supervisor. The user may have as many profiles as needed. The profiles may likely be oriented to control types and schedule types. Also, there may be some profiles based on a region or seasons of the year.

The user may run an exception report where the profile settings are compared to all the instances of the sales floor RTU selected for the report and showing only those RTU instances that do not match the corporate standard profile. The Opus exception report may then allow a user to perform a smart batch operation and send the profile settings out to all the RTU's found to be "out of spec" as a batch operation. This may allow the system profile settings to re-establish the RTU's to spec and bring the enterprise to its target operating conditions.

Also, the Opus exception report may allow the user to mark any of the found RTU's as "approved exceptions". This means that these RTU's may be known to be out of spec for maintenance reasons or other circumstances, and if it is an approved exception, the RTU will not necessarily be reset to the profile on a subsequent smart batch push.

Figure 2:
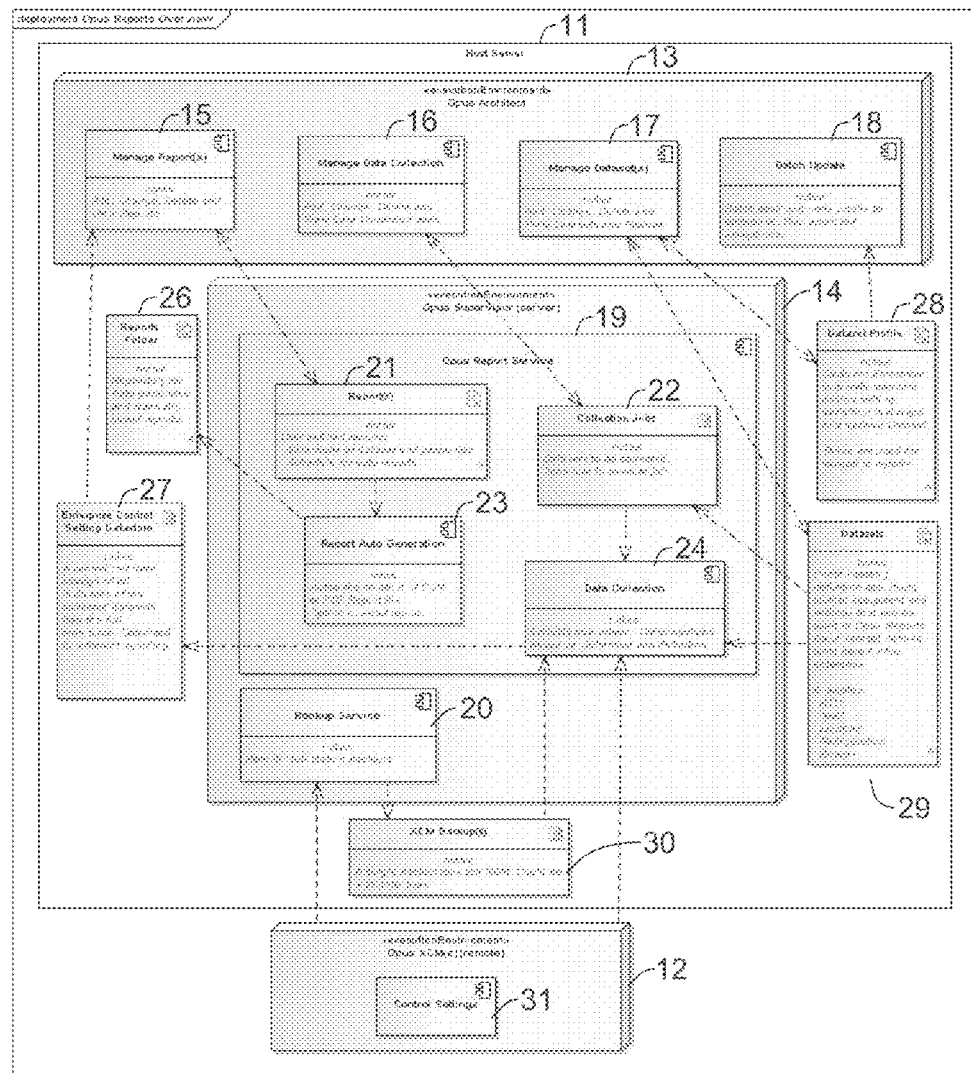
FIG. 2 in a diagram of an Opus™ reports overview.

FIG. 2 in a diagram of an Opus™ Reports overview. Host server 11 may be connected to one or more remote XCM(s) 12. Remote XCM(s) 12 may incorporate control settings 31. Host server 11 may incorporate Opus Architect™ 13 connected to an Opus Supervisor 14. Host server 11 may also incorporate a reports folder 26, an enterprise control setting datastore 27, a dataset profile 28, datasets 29 and an XCM Backup(s) module 30. Opus Architect 13 may incorporate a manage report(s) module 15, a manage data collection module 16, manage dataset(s) 17 and a batch update module 18. Opus supervisor (server) 14 may incorporate Opus Report Service 19 and a Backup Service 20. Opus Report Service 19 may incorporate a report(s) module 21, a collection jobs module 22, a report auto generation module 23 and a data collection module 24.

Manage reports module 15 may be connected to report(s) module 21. Module 21 may have user defined reports such as selections of dataset and properties, and a schedule for auto reports. Report(s) module 21 may be connected to report auto generation module 23. Module 23 may provide automatic creation of a CSV or PDF report file, with an option to email the report. Report auto generation module 23 may be connected to reports folder 26. Folder 26 may be a repository for auto generated and manually saved reports.

Enterprise control setting datastore 27 may be connected to a manage report(s) module 15. Manage report(s) module 15 may add, change, delete and view reports. Datastore 27 may be a centralized data storage of all instances of the collected datasets from the full enterprise. Datastore 27 may be optimized for efficient reporting.

Manage data collection module 16 may be connected to collection jobs module 22. Module 16 may add, change, delete and view data collection jobs. Datasets 29 may be connected to collection jobs module 22. Module 22 may collect datasets, and schedule to execute a job. Datasets 29 may control setting a definition specifying control equipment and setting that will be used in Opus reports. Each dataset may be defined once here for a full enterprise. Examples of datasets 29 may incorporate RTU, AHU, lighting, refrigeration and energy.

Manage dataset(s) module 17 may be connected to datasets 29. Module 17 may add, change, delete and view datasets and profiles. Dataset(s) module 17 may be connected to dataset profile 28. Profile 28 may be connected to batch update module 18. Module 18 may batch push a corporate profile to an enterprise. Approved exceptions may be skipped. Profile 28 may indicate customer enterprise corporate standard control setting definition that maps to a defined dataset. These may be used for exception reports.

Datasets 27 may be connected to data collection module 24. Collection by module 24 may be from either XCM or backups based on collection job definition. Collection module 24 may be connected enterprise control setting datastore 27.

Backup service 20 may be connected to XCM Backup(s) 30. Service 20 may provide periodic full station backups. XCM backup(s) may provide a single backup for each XCM. There may be, for example, more or less than 26,000 files. XCM Backup(s) 30 may be connected to data collection module 24. Remote Opus XCM(s) 12 may be connected to data collection module 24 and backup service 20.

Figure 3:
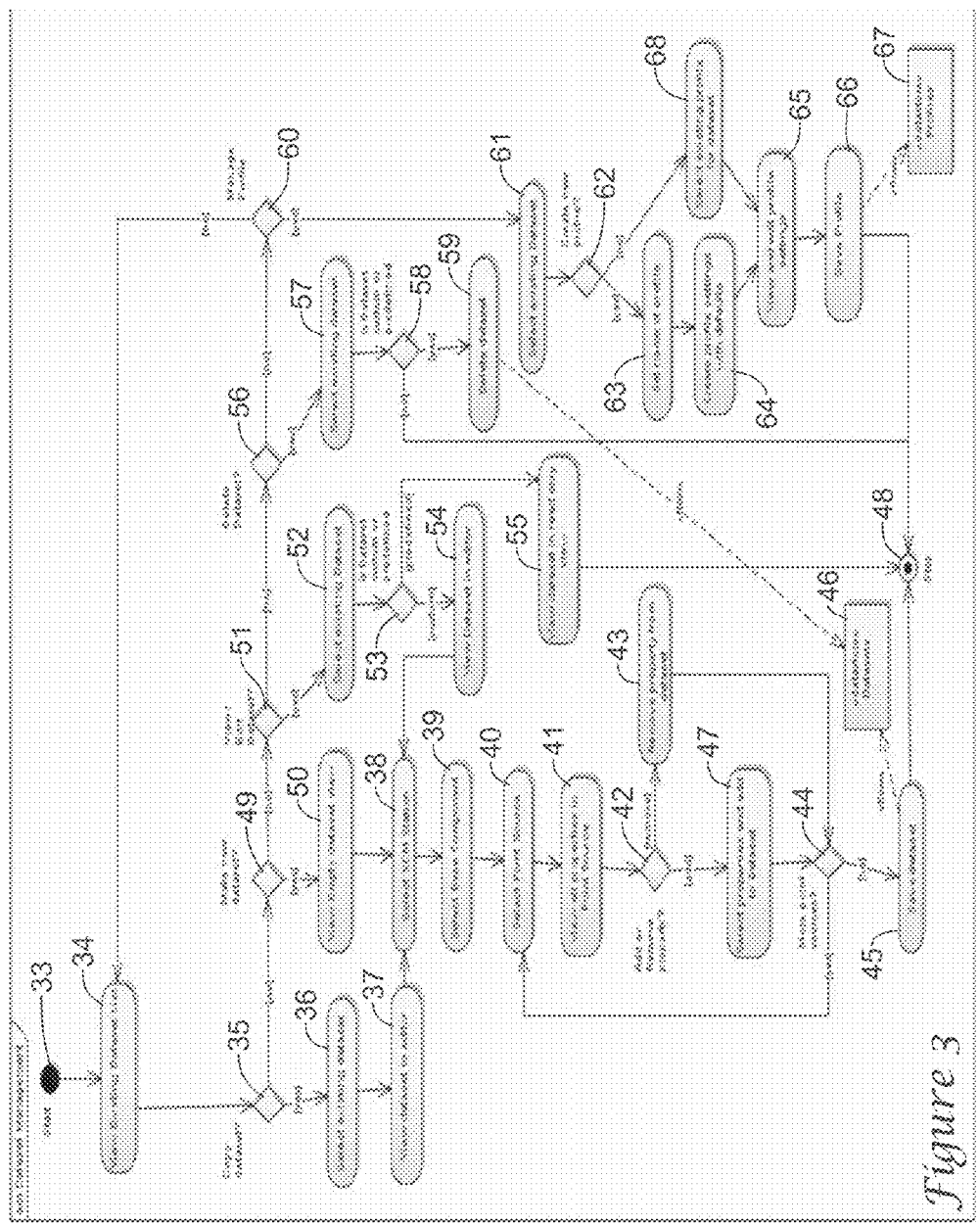
FIG. 3 is a diagram of a dataset management approach.

FIG. 3 is a diagram of a dataset management approach. A start at place 33 may result in viewing an existing dataset list at place 34. A next step may be a question of whether to copy the dataset at symbol 35. If the answer is yes, then an existing dataset is selected at symbol 36. At symbol 37, the dataset is viewed by an editor. An XCM station may then be selected at symbol 38. A sequence of items to follow may be select base component, select point source and view all properties in point as indicated at symbols 39, 40 and 41, respectively. Then at symbol 42, a question of whether to add or remove a property is asked. If it is to be removed, then the property may be removed from the dataset at symbol 43.

At symbol 44 is a question of whether there are more point sources. If the answer is no, then the dataset may be saved at place to datastore for datasets at symbols 45 and 46, respectively. If the answer is yes at symbol 44, then a return to symbol 40 may be made and sequence through symbols 40, 41 and 42 may be made. In response to the question of whether to add or remove a property, an answer to add may be made at symbol 47 where one or more properties are selected and added to the dataset. A next question is again whether there are more point sources or not at symbol 44. If yes, one may go to symbol 40, or if no, one may go to symbol 45. If the latter, then the dataset may be saved at symbol 45 to datastore at symbol 46, and then the approach may stop at place 48.

Returning to symbol 35, if an answer to the question to copy the dataset is no, then a question is whether to make a new dataset at symbol 49 may be asked. If the answer is yes, then an empty dataset may be viewed at symbol 50. The next item is to select an XCM station at symbol 38 and subsequent scenarios may be noted as indicated above.

If an answer is no, then a question of whether is to view or edit the dataset may be asked at symbol 51. If the answer is yes, then an existing dataset may be selected at symbol 52. A question of whether the dataset is custom or predefined may be asked at symbol 53. If the dataset is custom, then the data may be viewed in editor at symbol 54. At symbol 38, where the XCM station is selected, the subsequent scenarios may be noted as indicated above. If an answer of the question at symbol 53 is that the dataset is predefined, then the dataset may be looked at in a read only view at symbol 55. After the read only view, the approach may be stopped at place 48.

If an answer to the question at symbol 51 whether to view/edit the dataset is no, then a question whether to delete the dataset may be asked at symbol 56. If an answer is yes, then an existing dataset may be selected at symbol 57. A question at symbol 58 may be whether the dataset is custom or predefined. If the dataset is predefined, then the dataset may be deleted according to symbol 59 from datastore at symbol 46. If the dataset is custom, then the approach may stop at place 48.

If an answer to the question at symbol 56 whether to delete the dataset is no, then a question at symbol 60 may ask whether a profile is to be managed. If an answer is no, then a return to symbol 34 may be made and various scenarios may be followed after symbol 34 as noted above. If an answer to the question at symbol 60 is yes, then an existing dataset may be selected at symbol 61. A question at symbol 62 is whether a new profile should be created. If an answer is yes, then a name of the profile may be set at symbol 63. Then profile settings may be set with defaults at symbol 64. A following symbol 65 may indicate that the profile settings be viewed and edited. Then the profile may be saved at symbol 66 to a datastore of profiles at symbol 67 and the approach may stop at place 48.

If an answer to the question of whether to create a new profile at symbol 62 is no, then an existing profile may be selected for the dataset at symbol 68. Then at symbol 65, the profile settings may be viewed and edited. At the following symbol 66, the profile may be saved at symbol 66 to a data base of profiles at symbol 67 and the approach may stop at place 48.

Figure 4:
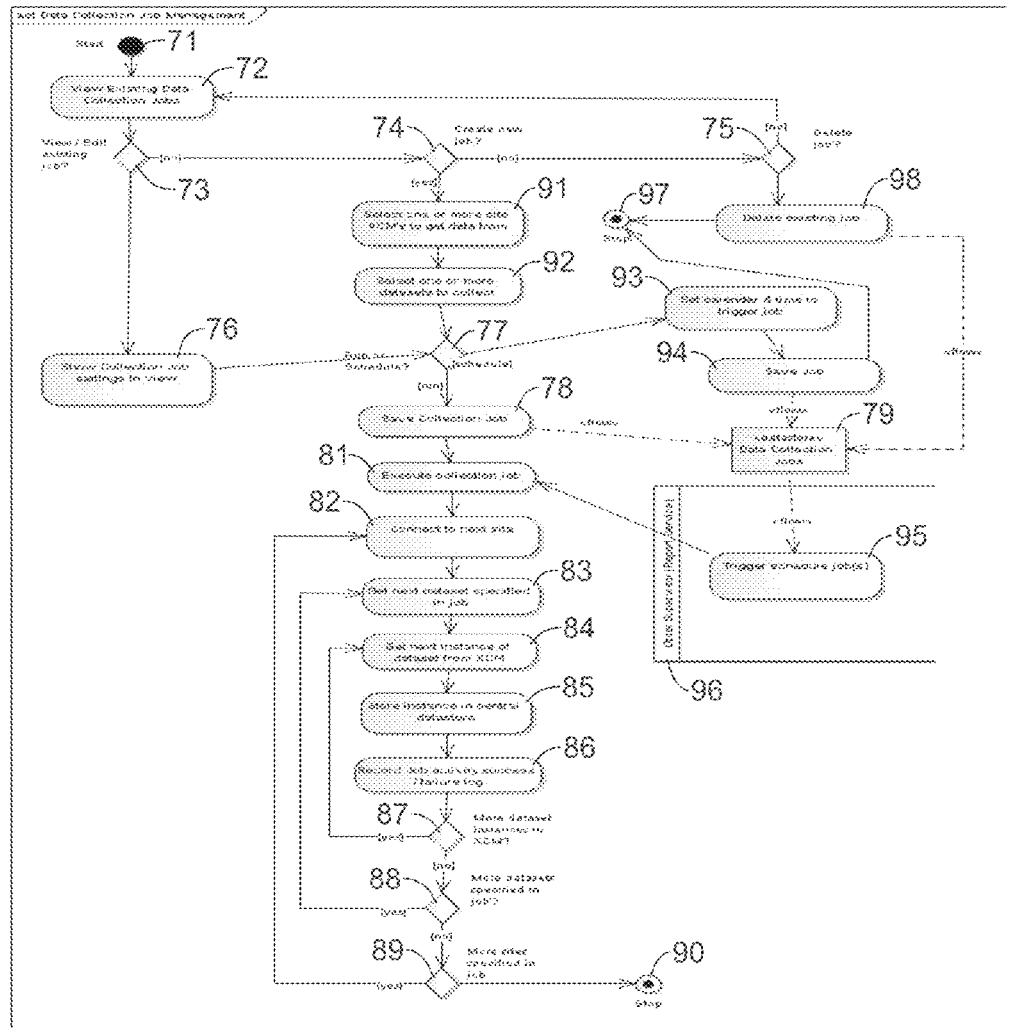
FIG. 4 is a diagram of data collection job management.

FIG. 4 is a diagram of data collection job management. A start of place 71 may lead to a symbol 72 for a view of existing data collection jobs. A question at symbol 73 may be whether to view/edit an existing job. If an answer is no, then a symbol 74 may ask a question of whether to create a new job. If an answer is no, then a symbol 75 may ask a question whether to eliminate the job. If an answer is no, then a return to symbol 72 may be made.

From symbol 72, a return to the question whether to view/edit the existing job may be made at symbol 73. If the answer is yes, then collection bob settings may be made in a view at symbol 76. A question at symbol 77 may ask whether to run at schedule. If an answer is to run, then the collection job may be saved at symbol 78 to a datastore at a symbol 79. The collection job may be executed at symbol 81. At symbol 82, there may be a connection to a next site. A next database may be specified in the job at symbol 83. A next instance of a database from XCM may be obtained at symbol 84. The instance may be stored in a central database according to symbol 85. A job activity success/failure log may be recorded at symbol 86. At symbol 87, a question of whether there are more dataset instances in the XCM may be asked. If an answer is yes, then a return may be made to symbol 84 and a sequence of activity may be repeated as indicated by symbols 84, 85 and 86. If the answer is no at symbol 87, then a question of whether there are more dataset instances in a job may be asked at symbol 88. If an answer to the question is yes, then a return may be made to symbol 83 and a sequence of activity may be repeated as indicted by symbols 83, 84, 85, 86 and 87. If the answer is no at symbol 88, then a question of whether more sites specified in the job may be asked at symbol 89. If an answer is yes, then a return may be made to symbol 82 and a sequence of activity may be repeated as indicated by symbols 82, 83, 84, 85, 86 and 87. If the answer is not at symbol 89, then the activity may be stopped at place 90.

In return to symbol 74, if the answer to the question of whether a new job is to be created is yes, then at symbol 91, one or more site XCM's may be selected from which data may be obtained. One or more datasets from which one can collect may be selected, according to symbol 92. Symbol 77, after symbol 92, may have the question of whether to run or schedule. If the answer is to run, then the activities beginning at symbol 78 and subsequent symbols may occur. If the answer is to schedule, then a calendar and time to trigger a job may be set at symbol 93. The triggered job may be saved, as indicated at symbol 94, in a datastore for data collection jobs of symbol 79. Information from the datastore at symbol 79 may flow to symbol 95 where schedule job(s) are triggered within an Opus Supervisor (report service) of symbol 96. After a job is saved at symbol 94, the activity may stop at place 97.

The question at symbol 75 whether to delete the existing job may be answered with yes. Then the existing job may be deleted as indicated by symbol 98. A flow of information about activity indicated by symbol 98 may flow to the datastore of symbol 79. After symbol 98 activity, the approach may stop at place 97.

Figure 5:
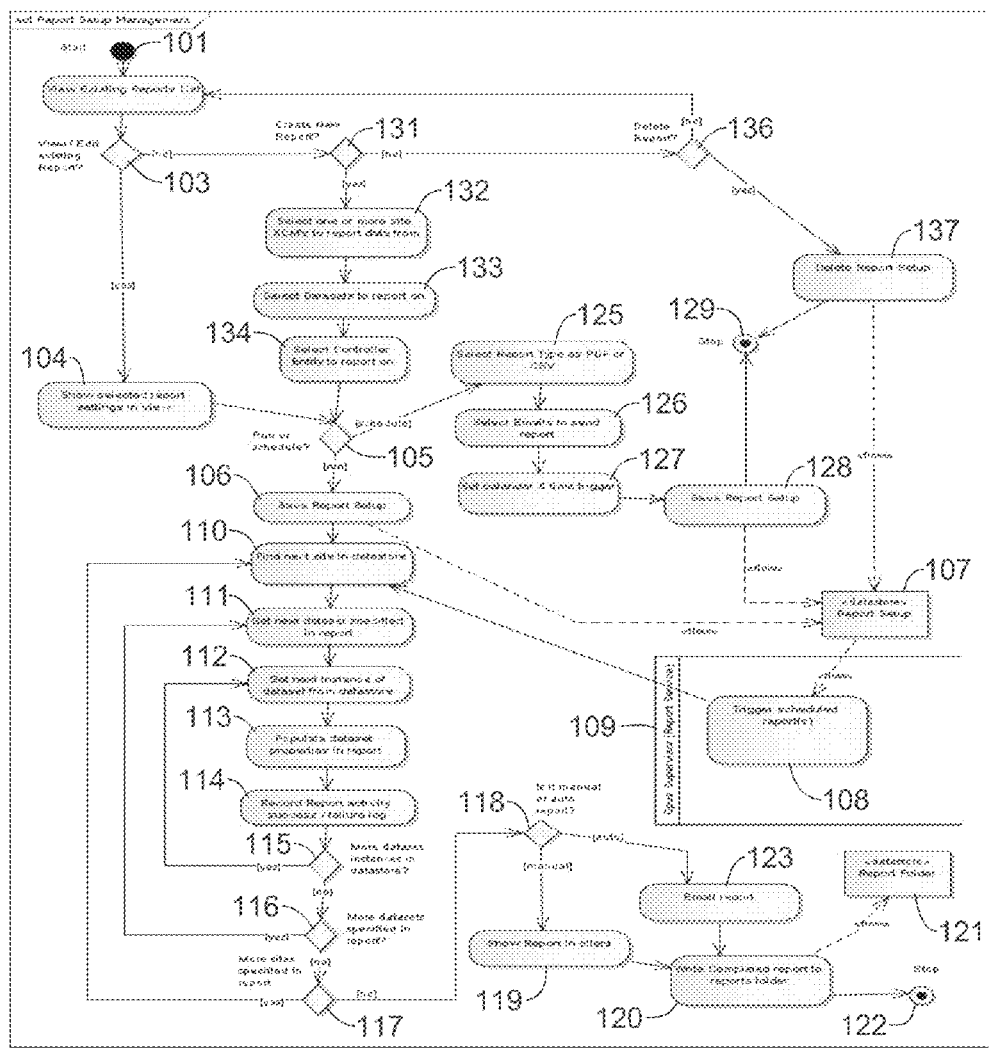
FIG. 5 is a diagram of report setup management.

FIG. 5 is a diagram of report setup management. A start at place 101 may lead to a view of an existing reports list at symbol 102. Then a question of whether to view/edit an existing report may be asked at symbol 103. If an answer is yes, then selected report settings may be shown in a view as indicated by symbol 104. At symbol 105, a question of whether to run or schedule may be asked. If an answer is to run, then a report setup may be saved, according to symbol 106, to a report setup datastore at symbol 107. A flow of information from datastore at symbol 107 to trigger scheduled report(s) at symbol 108 may occur within an Opus supervisor (report service) of symbol 109. After symbol 106, a next site in the datastore may be found at symbol 110. Then a next dataset specified in a report may be obtained as indicated in symbol 111. A next instance of a datastore may be obtained according to symbol 112. Then dataset properties in a report may be populated at symbol 113. A report activity success/failure log may be recorded. At symbol 115, a question of whether there are more datasets in a datastore may be asked. If an answer is yes, then a return to symbol 112 may occur and the activities of symbols 112, 113 and 114 may be repeated. If the answer is no at symbol 115, then a question of whether more datasets are specified in a report may be asked at symbol 116. If an answer is yes, then a return to symbol 111 may occur along with the activities of symbols 111, 112, 113, 114 and 115. If the answer at symbol 116 is no, then a question of whether more sites are specified in a report may be asked at symbol 117. If an answer is yes, then a return to symbol 110 may occur along with the activities of symbols 110, 111, 112, 113, 114, 115 and 116. If the answer at symbol 117 is no, then a question of whether the report is manual or auto may be asked at symbol 118. If an answer is manual, the report may be shown in a client at symbol 119. Then a completed report may be written to a report folder datastore at symbol 121 as indicated by symbol 120. The activity after symbol 120 may cease at place 122. If the answer to the question at symbol 118 is auto, then the report may be emailed according to symbol 123. A completed report may be reported to the reports folder at datastore 121 according to symbol 120. Then, the activity may stop at place 122.

If the answer to the question whether to run or schedule at symbol 105 is to schedule, then a selection of a report type as PDF or CSV may be made according to symbol 125. Emails to send a report may be selected at a symbol 126. A calendar and time trigger may be set according to symbol 127. A report setup may be saved at the datastore at symbol 107 according to symbol 128. After the report setup save, the activity may stop at place 129.

If the answer to the question of a view/edit of an existing report is no, then a question of whether a new report is to be created may be asked at symbol 131. If an answer is yes, then one or more XCM's may be selected from which data is reported. Datasets selected to report on may be determined at symbol 133. A controller entity to report on may be selected according to symbol 134. After symbol 134, the question of run or schedule at symbol 105 may be asked. The answers run and schedule may result in activity that is noted herein.

If the answer to the question at symbol 131 is no, then a question at symbol 136 may be whether a report is to be deleted. If an answer is yes, then a report setup may be deleted according to symbol 137. The activity may stop at place 129. If the answer to the question at symbol 136 is no, then the existing reports may be viewed at symbol 102. Subsequent activity at and after symbol 103 may be noted herein.

Figure 6:
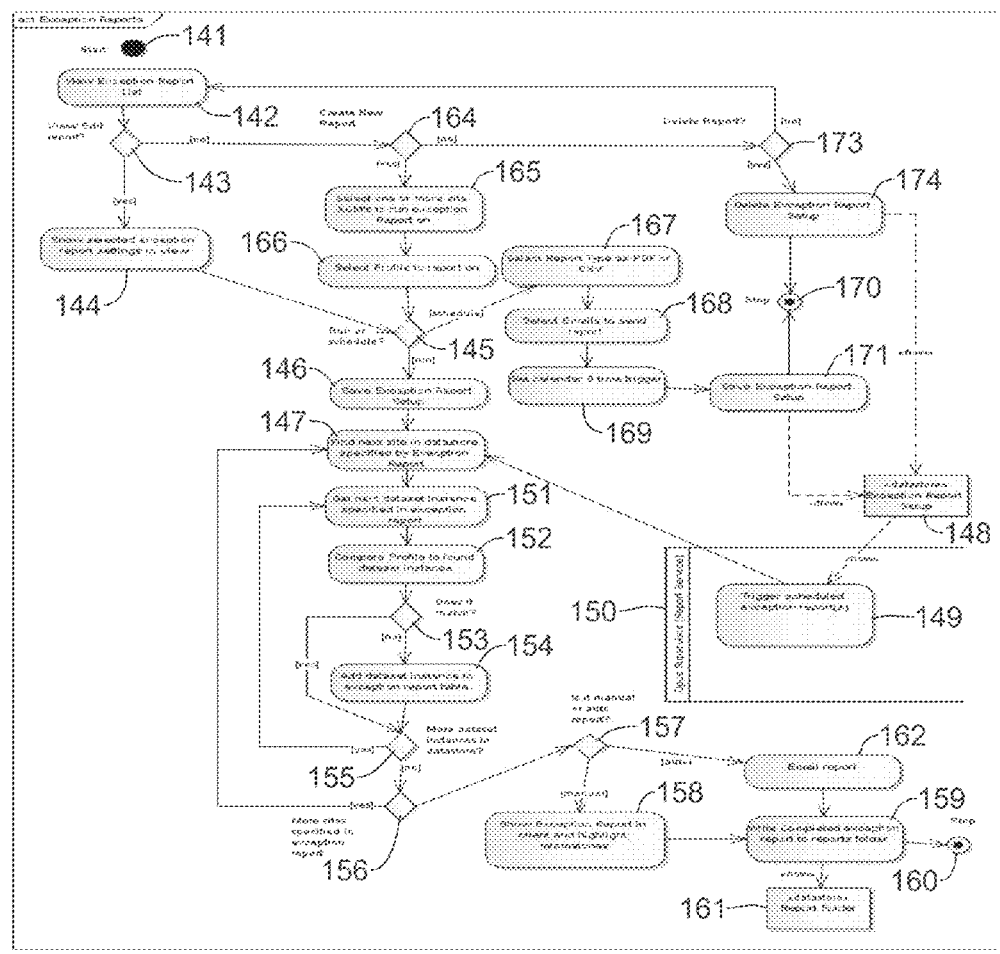
FIG. 6 is a diagram of exception reports.

FIG. 6 is a diagram of exception reports. A start at place 141 may result in a viewing an exception report list at a symbol 142. Then a question whether an edit report is to be viewed. If an answer is yes, then selected exception report settings may be shown in a view at symbol 144. A question may then be whether to run or schedule asked at symbol 145. An answer may be run and then an exception report setup may be saved at symbol 146. A next site in a datastore specified by an exception report may be found as indicated by symbol 147. The exception report setup at symbol 148 with a flow for scheduled exception report(s) to symbol 147 may be triggered at symbol 149 within an Opus supervisor (report service) at symbol 150. After symbol 147, a next dataset instance specified in an exception report may be obtained at symbol 151. Then a profile may be compared to a found dataset instance at symbol 152. A question of whether the profile matches the dataset instance may be asked at symbol 153. If an answer is no, then a dataset instance may be added at symbol 154. If the answer is yes, then a question of whether there are more dataset instances in a datastore may be asked at a symbol 155. If an answer is yes, then a return to symbol 151 may occur and activities of symbols 151, 152, 153 and 154 may be repeated as indicated above. If the answer is no, then a question of whether there are more sites specified in the exception report may be asked at symbol 156. If an answer is yes, then a return to symbol 147 may occur and activities of symbols 147, 151, 152, 153, 154 and 155 may be repeated as indicated above. If the answer is no, then a question at a symbol 157 may be whether the report is manual or auto. If an answer is manual, then the exception report in a client may be shown and mismatches may be highlighted according to a symbol 158. A completed exception report may be written to a reports folder in a datastore at symbol 161, according to symbol 159. Then the approach may stop at place 160. If the answer to the question at symbol 157 is an auto report, it may be emailed at symbol 162. Upon an emailing of the report, a completed exception report may be written to the reports folder in the datastore at symbol 161 according to symbol 159. The approach may stop at place 160.

As to an answer of no to the question of whether the exception report is viewed/edited at symbol 143. The answer may lead to a question whether a new report is created at symbol 164. If an answer is yes, then one or more site XCM's on which to run an exception report may be selected at symbol 165. A profile to report on may be selected according to symbol 166. A question of whether to run or schedule the report may be asked at symbol 145. The answer of a run is noted herein. If the answer is schedule, then a report type as PDF or CSV may be selected at symbol 167. Then emails may be selected to send a report at symbol 168. A calendar and time trigger may be set at symbol 169. An exception report setup may be saved, according to symbol 171, in the datastore at symbol 148, and the approach may stop at place 170.

If an answer to the question at symbol 164 is no, then a question of whether to delete the report may be asked at symbol 173. If an answer is yes, then an exception report setup may be deleted at symbol 174 with information going to datastore of symbol 148, and the approach being stopped at place 170. If the answer to the question at symbol 173 is no, then a return to the view exception report list at symbol 142 may occur. If an approach is to proceed from symbol 142, the activity is revealed herein.

Figure 7:
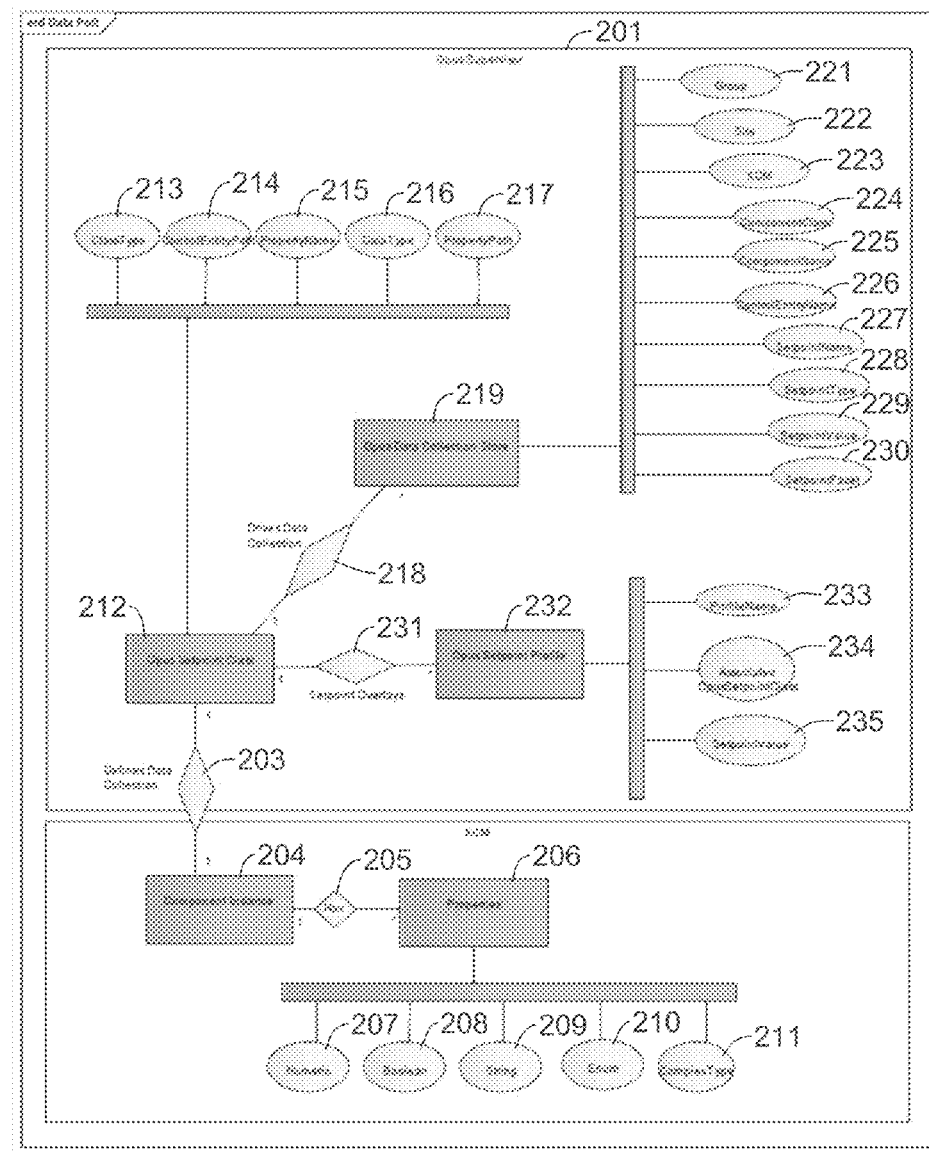
FIG. 7 is a diagram of a structure for data collection by an Opus supervisor and a site controller.

FIG. 7 is a diagram of a structure for data collection by an Opus supervisor 201 and an XCM 202. Data collection may be defined at symbol 203. A component instance 204 of XCM 202 may go to symbol 203. A "has" symbol 205 may be connected between component instance 204 and properties 206. Associated with properties 206 may be numeric 207, Boolean 208, string 209, enum 210 and complex type 211 characteristics.

A connection may go from data collection definition to an Opus setpoint class 212. Associated with class 212 may be class type 213, control entity path 214, property name 215, data type 216 and property path 217.

Data collection may be driven at symbol 218. Collected data may be stored at an Opus data collection store 219. Classifications or groupings of data in store 219 may be according to group 221, site 222, site controller 223, component class 224, component name 225, control entity name 226, setpoint name 227, setpoint type 228, setpoint value 229, and setpoint facet 230.

Following Opus setpoint class 212 may be setpoint overlays 231, and then an Opus setpoint profile at symbol 232. Aspects of a setpoint profile may incorporate a profile a name 233, associated Opus setpoint class 234, and setpoint value 235.

Figure 8:
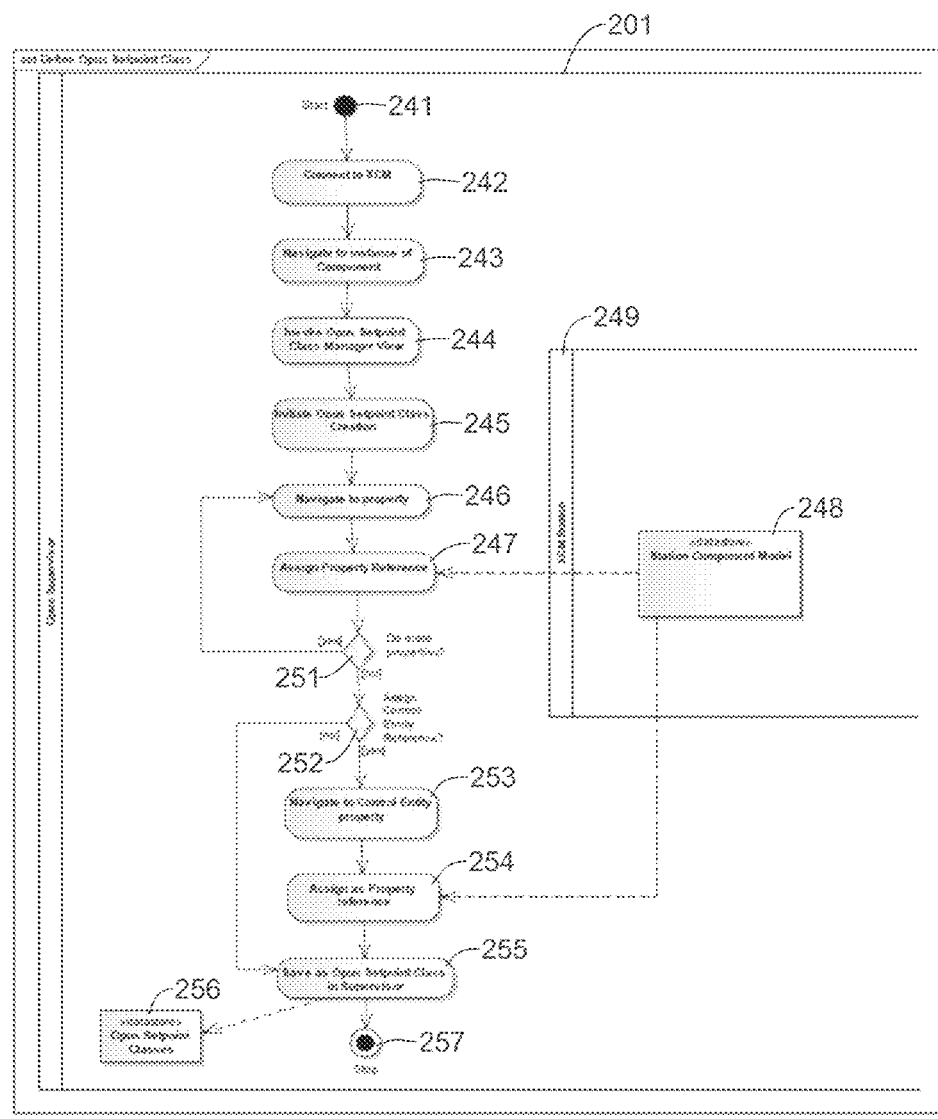
FIG. 8 is a diagram that may define an Opus setpoint class within Opus supervisor.

FIG. 8 is a diagram that may define an Opus setpoint class 212 (FIG. 6) within Opus supervisor 201. A start may begin at place 241 and go to symbol 242 where a connection can be made to an XCM (i.e., site controller). An instance of a component may be navigated to at symbol 243. An Opus setpoint class manager view may then be invoked at symbol 244. At symbol 245, an Opus setpoint class creation may be invoked. Then a property may be navigated to at symbol 246. A property reference may be assigned at symbol 247. A station component store may be received from a datastore 248 at XCM station 249. A question of whether to do more properties may be asked at symbol 251. If an answer is yes then a return to symbol 246 may be made and the actions of symbols 246 and 247 may be repeated. If the answer is no, then a question of whether to assign a control entity reference may be asked at symbol 252. If an answer is yes, then a control entity property may be navigated to at symbol 253. A property reference may be assigned at symbol 254. At symbol 255, the information after symbol 254, may be saved as an Opus setpoint class in supervisor 201 at a datastore 256 for Opus setpoint classes. From symbol 255, the approach may end at 257.

If the answer to the question at symbol 252 is no, then the information may be saved at symbol 255 as an Opus setpoint class in supervisor 201 at datastore 256, and the approach may end at place 257.

Figure 9:
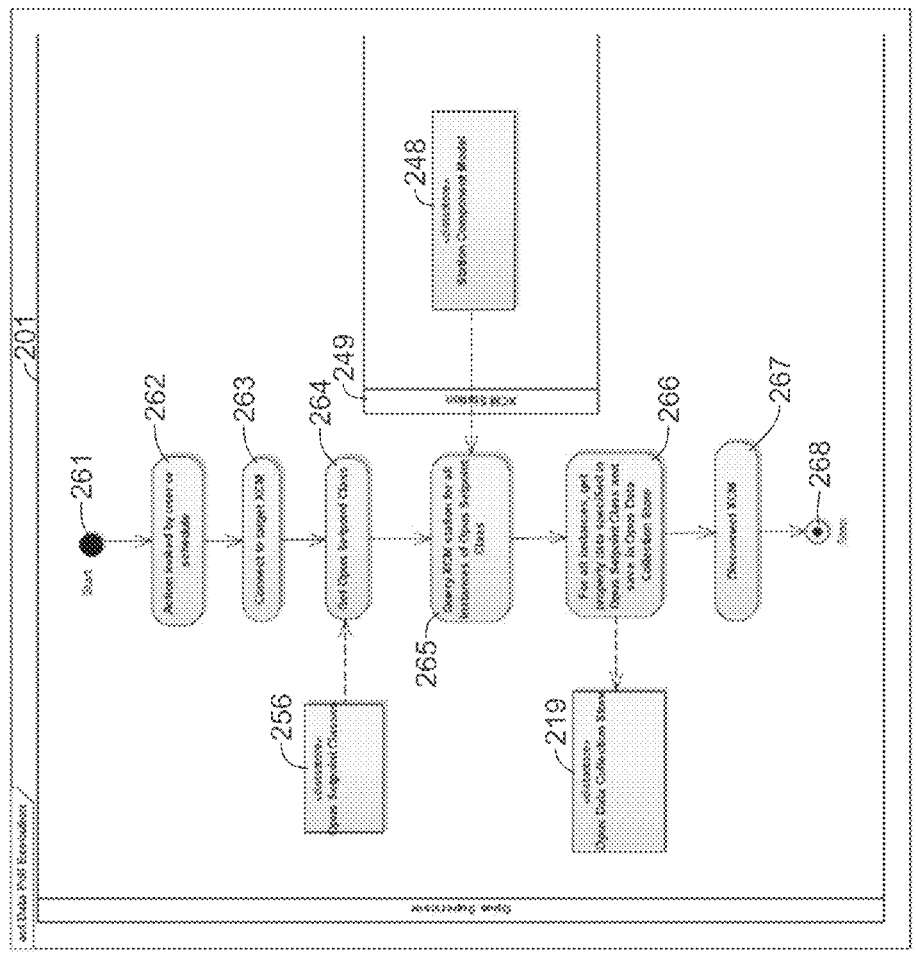
FIG. 9 is a diagram of a data poll execution approach within an Opus supervisor.

FIG. 9 is a diagram of a data poll execution approach within Opus supervisor 201 which may start at place 261. An action may be invoked by a user or a schedule at symbol 262. Then a connection to an XCM (i.e., site controller) may be made at symbol 263. An Opus setpoint class may be obtained from a datastore 256. Then a station component model datastore 248 of an XCM station 249 may be queried for virtually all instances of an Opus setpoint class at symbol 265. For all such instances at symbol 266, property data specified in the Opus setpoint class may be obtained and saved in an Opus data collection store of datastore 219. The target XCM may be disconnected at symbol 267 and the approach may stop at place 268.

Figure 10:
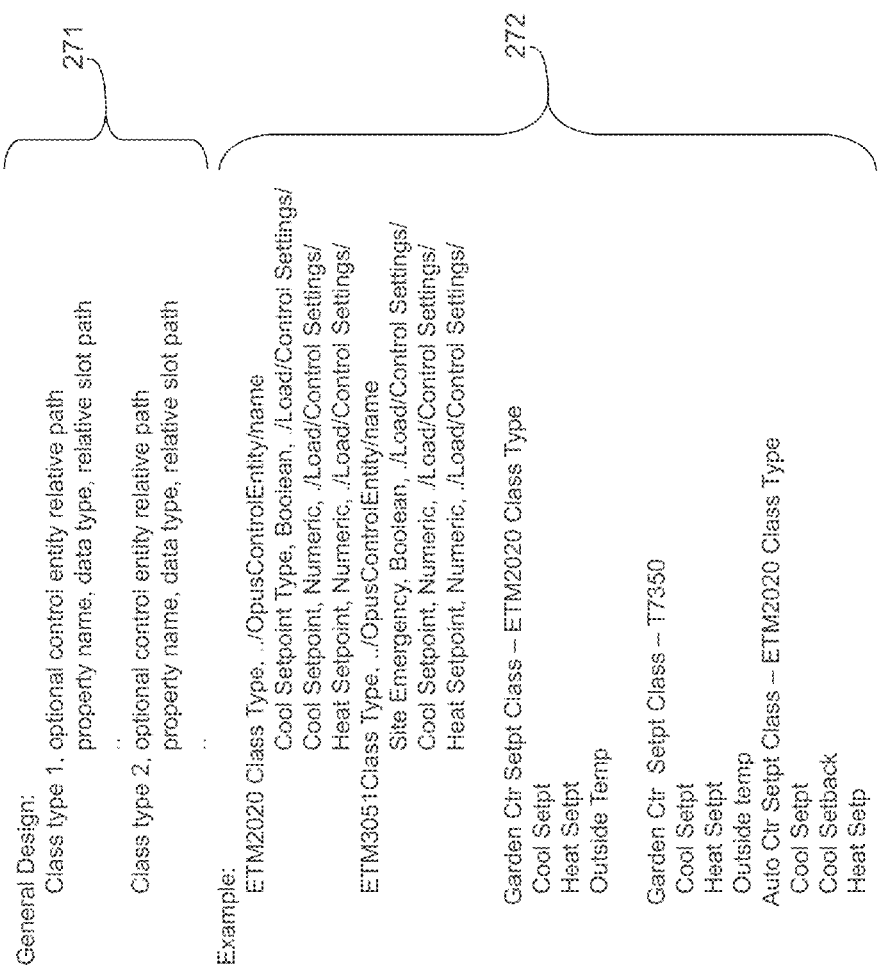
FIG. 10 is a diagram of a layout of a general design of a setpoint class structure.

There may be data poll prototype requirements. First, one may define an XML file structure identifying Opus setpoint classes. Hardcoded entries may be entered for a prototype. For any component in station a configuration may be classified as an Opus setpoint class. A component may be classified as an Opus setpoint class one time for the entire enterprise within the Opus supervisor. The Opus setpoint classes may be used for data collection and for profiles. The user may identify a station component as an Opus setpoint class and then assign properties to be polled into the definition. The user may optionally attach a control entity reference. These Opus setpoint class definitions may be stored in a separate XML file within the Opus supervisor. A user interface view may be designed to allow easy configuration of the Opus setpoint classes. It may be assumed that the setpoint class definition is consistent across virtually all sites. FIG. 10 is a diagram of a layout of a general design 271 of a setpoint class structure. An example 272 reveals an application of the structure.

Figure 11:
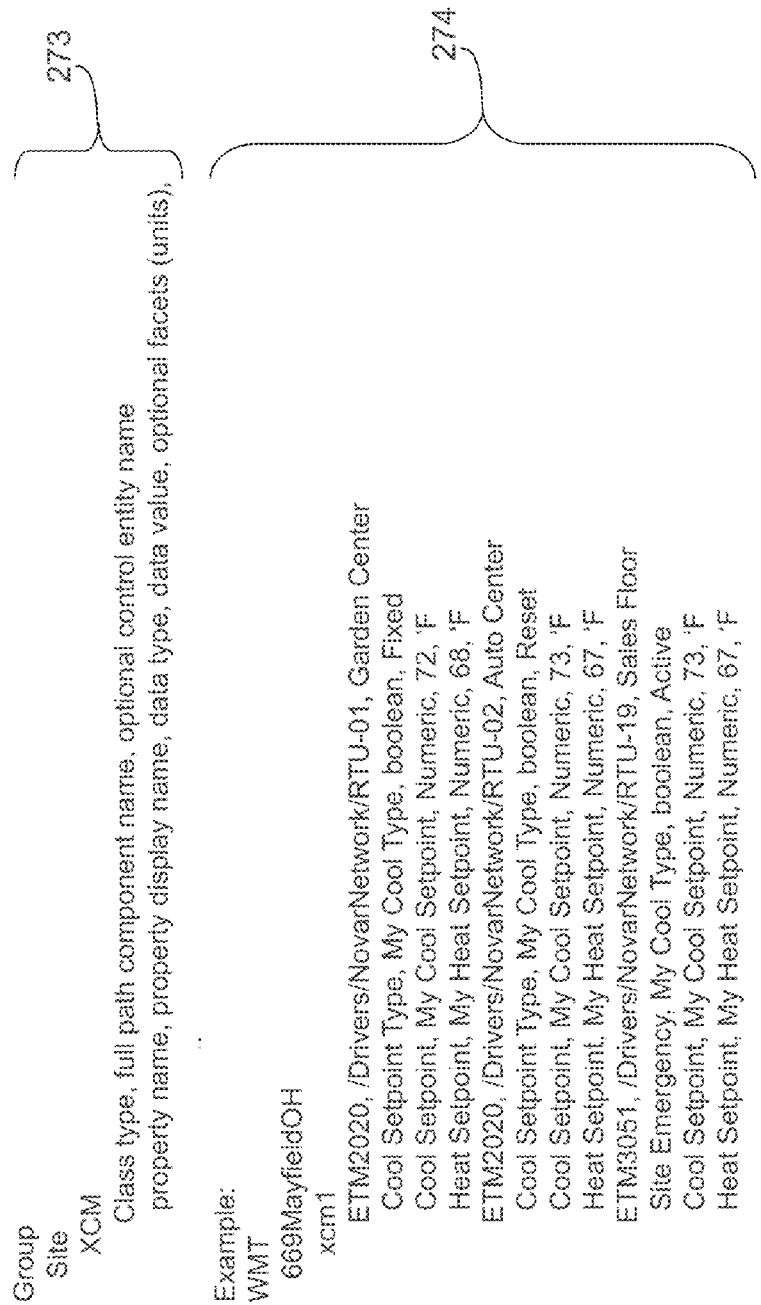
FIG. 11 is a diagram of a layout of a design and an example of a file structure of a data collection store.

Second, one may define XML file structure to Opus data collection store. The store may by default be a separate bog file (not in config.bog) in the Opus supervisor. A bog file should be used to allow for BQL queries to be run. One may note that the final design should provide an option to allow for persistence to an SQL relational database. A design of the Opus data collection store should be to allow for fast and efficient data searches with user specified filtering. In a large enterprise, the datastore could contain 50 million property records. (For instance, there may be 5000 sites, each with 5 XCMs, each with 100 class instances, and each with an average of 20 properties) Therefore, the prototype testing should include large scale testing to validate the use of the bog file structure. FIG. 11 is a diagram of a layout of a design 273 and an example 274 of a file structure of a data collection store.

Third, there may be user invoked action to connect to one or more XCM controllers to collect data defined as Opus setpoint class(es) and save in Opus data collection store. For the prototype, this may be simply a user invoked action. The final design may need this be a service that can be scheduled. Also, the default behavior may be to connect to the target sites over a Niagara network to poll data. One may consider a final design option to retrieve data from backup files within the Opus Supervisor. The expected outcome after running this action may be that the Opus data collection store has been updated with setpoint data for virtually all instances of all the Opus setpoint classes within every target site. If an instance of a class or a class property no longer exists in the site, it should be removed from the Opus data collection store if it had previously existed.

Fourth, Opus setpoint profiles may provide the user an approach of establishing enterprise wide standards of setpoints for Opus setpoint classes. Once an Opus setpoint class has been defined, one or more Opus setpoint profiles may be associated with an Opus setpoint class. Once an Opus setpoint profile is created, the user may apply specific setpoint values to the property definitions. Once set, the profile may be used by the Opus supervisor to perform exception reporting and/or multi-site batch setpoint updates to enforce consistency across the target sites.

To recap, an approach for managing and communicating with large numbers of controllers, may incorporate defining a dataset as a configuration map for identifying a group of data sought, applying a dataset collection job to virtually all controllers in an enterprise to obtain instances of the dataset, storing the instances of the dataset obtained into a common datastore, developing a report format for selecting certain instances of the dataset obtained, and selecting the certain instances of the dataset obtained in the report format for viewing or analysis.

The approach may further incorporate collecting data from multiple locations, and organizing the data into identifiable collections that are compiled into the report format.

The defining a dataset may permit a user to select the data for use in one or more reports having the report format. The dataset may incorporate a pattern of the configuration map to be used across virtually all of the site controllers in the enterprise.

The dataset collection job may incorporate virtually all instances of the dataset to be collected from site controllers into the common datastore. When the dataset collection job is executed, a connection to each site controller specified in the dataset collection job may be established, and the instances of the dataset specified may be copied into the common datastore. When the dataset collection job is executed, an instance of the dataset may be retrieved from a backup file of a site controller specified in the dataset collection job and copied into the common datastore.

The approach may further incorporate configuring reports of the instances of the dataset. The reports may be created by grouping data from datasets. The user may manually invoke and view data in a report of tabular form. A report may be set up to be automated to run at a specified date and time.

The approach may further incorporate executing an automated report job that produces contents of a report in a pdf or csv file. The automated report job with contents in the pdf or csv file may be manually selected and opened in a report viewer. The pdf or csv file may be automatically emailed to one or more recipients.

The approach may further incorporate creating a profile of control setpoints or schedules across an enterprise, and running an exception report that involves comparing settings of a profile to particular instances of the dataset selected for the exception report and showing only those instances without a match with the profile.

The approach may further incorporate creating a profile of control setpoints or schedules across an enterprise, composing an exception report, and sending settings of the profile to the particular instances of dataset within a site controller found to be out of spec as a batch operation to one or more site controllers. The particular instances of the dataset known to be out of spec may be reset to the settings of the profile.

The particular instances of the dataset displayed as out of spec in the exception report may be marked as approved exceptions.

The particular instances of the dataset known as approved exceptions to be out of spec are not necessarily reset to the settings of the profile during a batch operation to one or more site controllers.

An apparatus for managing and communicating with large numbers of controllers, may incorporate a supervisor controller, a plurality of site controllers connected to the supervisor controller, and one or more field controllers connected to virtually each of the plurality of site controllers.

A field controller may provide real time control of one or more items selected from a group consisting of, but not limited to, HVAC units, lighting panels, refrigeration circuits, and metering circuits. A dataset may be defined as a configuration map for identifying a group of data sought from virtually all controllers. A dataset collection job may be applied to virtually all controllers to obtain instances of the dataset. Instances of the dataset may be stored in a common datastore. A report format may be developed for selecting certain instances of the dataset for viewing or analysis.

The dataset collection job may incorporate virtually all instances of the dataset to be collected from site controllers into the common datastore. When the dataset collection job is executed, a connection to each site controller specified in the dataset collection job may be established and the instances of the dataset specified may be copied into the common datastore.

When the dataset collection job is executed, an instance of the dataset may be retrieved from a backup file of a site controller specified in the dataset collection job and copied into the common datastore.

An approach for managing and communicating with large numbers of controllers, may incorporate providing a supervisor controller, connecting one or more site controllers to the supervisor controller, connecting one or more field controllers to the one or more site controllers, connecting one or more pieces of building environmental control and conditioning equipment to one or more field controllers, defining a dataset as a configuration map for identifying a group of data sought, applying a dataset collection job to virtually all controllers in an enterprise to obtain instances of the dataset, storing the instances of the dataset obtained into a common datastore, developing a report format for selecting certain instances of the dataset obtained, and selecting the certain instances of the dataset obtained in the report format for viewing or analysis.

The approach may further incorporate configuring reports of the instances of the dataset. The reports may be created by grouping data from datasets.

The user may manually invoke and view data in a report of tabular form, or a report may be set up to be automated to run at a specified date and time.

The approach may further incorporate executing an automated report job that produces contents of a report in a pdf or csv file. The automated report job with contents in the pdf or csv file may be manually selected and opened in a report viewer, or the pdf or csv file may be automatically emailed to one or more recipients.

Relevant patent documents may incorporate U.S. patent application Ser. No. 13/402,780, filed Feb. 22, 2012, and entitled "A Supervisory History View Wizard; and U.S. patent application Ser. No. 12/703,476, filed Feb. 10, 2010, and entitled "A Multi-Site Controller Batch Update System". U.S. patent application Ser. No. 13/402,780, filed Feb. 22, 2012, is hereby incorporated by reference. U.S. patent application Ser. No. 12/703,476, filed Feb. 10, 2010, is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An apparatus for managing and communicating with large numbers of controllers, comprising:
   a supervisor controller;
   a plurality of site controllers configured to be connected to the supervisor controller; and
   one or more field controllers each connected to at least one of the site controllers; and
   wherein:
   a field controller can provide real time control of one or more items selected from a group consisting of, but not necessarily limited to, HVAC units, lighting panels, refrigeration circuits, and metering circuits;
   a dataset is defined as a configuration map for identifying a group of data sought from controllers;
   a dataset collection job is applied to selected site controllers to obtain instances of a setpoint class and when the dataset collection job is executed, a connection to each site controller selected in the dataset collection job is established, a setpoint class is obtained from a datastore, and a model datastore for each site controller selected in the data collection job is queried for instances of the setpoint class;
   the instances of the setpoint class are stored in a common datastore;
   a report format is developed for selecting certain instances of the setpoint class for viewing or analysis; and
   after obtaining the setpoint class, querying for instances of the setpoint class, and storing the instances of the setpoint class in a common datastore, the connection to each site controller selected in the dataset collection job is disconnected.

2. The apparatus of claim 1, wherein:
   the dataset collection job comprises all instances of the setpoint class to be collected from site controllers into the common datastore; and
   when the dataset collection job is executed, the instances of the setpoint class specified are copied into the common datastore.

3. The apparatus of claim 2, wherein when the dataset collection job is executed, an instance of the setpoint class can be retrieved from a backup file of a site controller specified in the dataset collection job and copied into the common datastore.

4. A method for managing and communicating with large numbers of controllers, comprising:
   providing a supervisor controller;
   connecting one or more field controllers to one or more site controllers;
   connecting one or more pieces of building environmental control and conditioning equipment to one or more field controllers;
   defining a dataset as a configuration map for identifying a group of data sought, the group of data sought are instances of a setpoint class;
   creating a dataset collection job by selecting one or more site controllers from which the instances of the setpoint class are to be obtained;
   triggering the dataset collection job to the selected one or more site controllers in an enterprise to obtain the instances of the setpoint class;
   in response to triggering the dataset collection job, connecting to each of the selected one or more site controllers, obtaining the setpoint class from a datastore, and querying a model datastore of each of the selected one or more site controllers for instances of the setpoint class;
   storing the instances of the setpoint class obtained into a common datastore;
   developing a report format for selecting certain instances of the setpoint class obtained;
   selecting the certain instances of the setpoint class obtained in the report format for viewing or analysis; and
   disconnecting from each of the selected one or more site controllers after obtaining the setpoint class from the datastore, querying the model datastore of each of the selected one or more site controllers for instances of the setpoint class, and storing the instances of the setpoint class into the common datastore.

5. The method of claim 4, further comprising:
   configuring reports of the instances of the setpoint class; and
   wherein the reports are created by grouping data from datasets.

6. The method of claim 5, wherein:
   the user manually invokes and views data in a report of tabular form; or
   a report can be set up to be automated to run at a specified date and time.

7. The method of claim 6, further comprising:
   executing an automated report job that produces contents of a report in a pdf or csv file; and wherein the automated report job with contents in the pdf or csv file can be manually selected and opened in a report viewer, or the pdf or csv file can be automatically emailed to one or more recipients.

8. The method of claim 4, further comprising:
creating a profile of control setpoints or schedules across the enterprise; and
running an exception report that involves comparing settings of a profile to particular instances of the setpoint class selected for the exception report and showing only those instances without a match with the profile.

9. The method of claim 4, further comprising:
creating a profile of control setpoints or schedules across the enterprise;
composing an exception report; and
sending settings of the profile to the particular instances of the setpoint class within a site controller found to be out of spec as a batch operation to one or more site controllers; and
wherein the particular instances of the setpoint class known to be out of spec are reset to the settings of the profile.

10. The method of claim 9, wherein the particular instances of the setpoint class displayed as out of spec in the exception report can be marked as approved exceptions.

11. The method of claim 10, wherein the particular instances of the setpoint class known as approved exceptions to be out of spec are not necessarily reset to the settings of the profile during a batch operation to one or more site controllers.

\* \* \* \* \*